United States Patent Office 3,356,776
Patented Dec. 5, 1967

3,356,776
METHOD OF FABRICATING CERAMIC
NUCLEAR FUEL PRODUCT
Albert B. Meservey, Oak Ridge, John D. Sease, Knoxville, and Robert B. Fitts, Oak Ridge, Tenn., assignors to the United States of America as represented by the United States Atomic Energy Commission
No Drawing. Filed Sept. 30, 1966, Ser. No. 584,065
10 Claims. (Cl. 264—.5)

The invention described herein was made in the course of, or under, a contract with the U.S. Atomic Energy Commission. This invention relates generally to neutronic reactor fuels and the fabrication thereof, and more particularly to the fabrication of ceramic-type neutronic fuel rods of thoria and thoria-urania material by employing a novel wet-forming and sintering process.

In many nuclear reactor applications it is preferable to use reactor fuels having rod-like configurations. These fuel rods as previously known usually consist of a suitable reactor fuel material in powder, irregular granule, or microsphere form which has been encased in a tubulation of metal cladding material. The fuel material is frequently subjected to some form of compaction, e.g., vibratory compaction, while being loaded into the cladding for increasing the fuel density. While these fuel rods function in a satisfactory manner, the fabrication techniques employed in their construction involve complex and time-consuming procedures which are relatively expensive and do not lend themselves to high production rates.

Another technique of fabricating fuel rods that would appear to enjoy considerable monetary savings and production increases is one of extrusion whereby a fuel material, e.g., an actinide such as thoria, in powder form is mixed with a suitable binder to form an extrudable paste and thereafter extruded into the desired configuration. However, in attempting to extrusion-form fuel rods from actinides by practicing previously suggested or known extrusion techniques several drawbacks or shortcomings become readily evident. For example, thoria powder is not basically a colloidal material in water and would therefore require the presence of some other binder to hold the thoria powder in suspension for forming a plastic or paste-like mass capable of being extruded and maintaining its shape after extrusion. Normally, such a binder or plasticizer would be an organic liquid which becomes plastic when mixed with the powder and which carbonizes and vaporizes or burns out upon being subjected to high temperatures. However, the driving off or removal of an organic binder from an extruded thoria rod requires the use of excessively high temperatures which may result in some of the binder becoming trapped in the rod due to initiation of sintering action on the rod surface or in the formation of an actinide carbide due to the presence of the carbonized binder. The presence of trapped organic material in the thoria fuel rod is deleterious because of the effects such material would have upon the function of the fuel rod in a nuclear environment and also upon the structural integrity and density of the fuel rod. From a standpoint of large-scale production, the use of high temperature equipment for effecting the removal of the organic binder is an expensive consideration which should be avoided or minimized if possible. Further, the sintering of structures formed of thoria powders requires excessively high temperatures in the area of about 1800° C. to 2000° C.

It is an aim of the present invention to provide for the fabrication of neutronic fuel rods by extrusion or other wet-forming procedures whereby the above and other shortcomings or drawbacks are obviated or substantially minimized. Applicants have found that thoria and thoria-urania bodies in ceramic form suitable for use in nuclear reactors may be readily and economically produced by utilizing an extrudable mass of clay-like colloidal thoria containing water as the binding agent. Generally, the process for fabricating fuel rods in accordance with the teachings of the present invention comprises the addition of thoria powder to an aqueous solution containing a nitrate anion or other anion for forming a homogeneous, nitrate-stabilized thoria sol which is thereafter concentrated by evaporating a portion of the residual water to provide a dense non-sticking material having the handling qualities similar to those of natural clay. The solution contains a greater quantity of nitrate anions or other anions than necessary to merely form a colloidal dispersion in that the formation of the clay-like material requires the presence of sufficient anions to effect partial flocculation of the thoria. This clay-like thoria may then be wet-formed in a suitable manner such as by extrusion into the desired configuration, dried in air, and thereafter fired to provide a ceramic thoria product. Pre-sintered and/or lightly calcined thoria powders may be kneaded into the plastic or clay-like thoria mass prior to the extrusion thereof for reducing sintering shrinkage, improving dimensional control, eliminating cracking, and for providing a product of controllable sintered density.

An object of the present invention is to provide new and improved ceramic bodies of actinide materials for use as nuclear reactor fuels.

Another object of the present invention is to fabicate elongate ceramic bodies of actinides in a relatively economical and highly productive manner.

Another object of the present invention is to fabricate nuclear reactor fuels from actinide by wet-forming a plastic actinide material.

A further object of the present invention is to provide for the extrusion of an actinide material by preparing a plastic body of actinide powders.

A further object of the present invention is to provide for the fabrication of nuclear reactor fuels whereby the density of the final ceramic product may be selectively varied.

A still further object of the present invention is to provide a process for producing neutronic fuels in rod-like configuations from thoria and thoria-urania materials.

Other and further objects of the invention will be obvious upon an understanding of the illustrative embodiment about to be described, or will be indicated in the appended claims, and various advantages not referred to herein will occur to one skilled in the art upon employment of the invention in practice.

As briefly mentioned above, the present invention relates to a process for preparing thoria and thoria-urania ceramic bodies in preselected sizes, densities, and shapes that are particularly suitable for use as nuclear reactor fuel elements. Generally, this process for preparing a ceramic product of an actinide oxide material in a predetermined configuration comprises the steps of admixing a powdered actinide oxide material with an aqueous solution containing a sufficient quantity of nitrate anions for forming a coagulated or flocculated, nitrate-stabilized colloidal dispersion, concentrating the dispersion by removing therefrom some nitrate and sufficient water to provide a sol having a plastic, clay-like consistency, wet-forming the sol into the predetermined configuration, removing essentially all the water from the formed mixture, and thereafter firing the formed mixture to sinter the latter and thereby provide the desired ceramic product.

While the process herein described teaches the use of nitric acid for providing the anion in the thoria sol forming solution, it will appear clear that other inorganic anion providing materials may be used, such as, for example, the single charged bromides, fluorides, chlorides, etc., or double and triple charged materials such as sulfates and phosphates, respectively.

Described in greater detail, the process of the present invention comprises the addition of a quantity of a powdered actinide oxide, preferably steam denitrated thoria powder containing about 0.03 mol nitrate per mol of thoria, to a weak nitric acid solution maintained at a temperature of about 95° C. to about 100° C. and subjected to continuous stirring for inhibiting settling. The quantity of thoria powder added to the solution is primarily dependent upon the strength of the solution. For example, with a 0.50 M nitric acid solution about 845 grams of thoria may be added per liter of solution over about a five-minute time interval. If thickening occurs, concentrated nitric acid in increments of about 0.2 percent of the total volume may be added to the solution until the latter is sufficiently fluid to permit motion throughout the entire volume. The nitrate anion in the solution causes the thoria powders to take on the same electrical charge to form a colloidal dispersion of thoria, or, in other words, a nitrate-stabilized sol. Normally, the colloidal dispersion is formable in a solution containing about 0.08 mol nitrate per mol of thoria. However, in order to form the colloidal, clay-like thoria mass envisioned by the present invention, the solution must contain about 0.15 to about 0.18 mol nitrate per mol of thoria to effect coagulation or flocculation of the colloidal thoria for forming colloidal-thoria coagulates.

By maintaining a temperature in the range of about 95° C. to about 100° C. along with sufficient agitation to the solution to prevent bottom caking, the water evaporation rate is sufficient to effect about a 45-percent reduction in volume in about 4 hours. These conditions cause the solution to go through a sequence of consistencies ranging from creamy to water-thin and eventually provide a phase separation due to partial flocculation of the colloidal thoria for the formation of a readily settleable precipitate of colloidal-thoria coagulates. It is, however, necessary to terminate the evaporation at a critical stage where this partial flocculation occurs, but also where essentially the entire quantity of thoria is still in a colloidal state since at this time the thoria is readily settleable, leaving a clear supernate. The precipitate is a homogeneous, dense, non-sticking colloidal material which is separable from a portion of the water and nitrate contained therein to provide a plastic, clay-like material suitable for wet-forming and having handling characteristics similar to natural clay. A larger fraction of small particle sizes than desirable may be produced if a temperature lower than the preferred temperature of 95° C. to 100° C., such as, for example, 80° C. to 90° C., is employed during the peptization, concentration, and precipitation stages. Also, if the proper temperature is maintained for an insufficient duration or if the water content is not reduced by the specified amount, i.e., about 45 percent by volume, products similar to those resulting from the use of the excessively low temperatures may result. Consequently, the time, temperature, and evaporation factors are important to the production to the desired precipitate. If the rate of evaporation is greater than essentially that above specified an incremental addition of water may be utilized to compensate for the excessive volume reduction.

After the precipitate is formed, it is separated from the supernate in a suitable filter mechanism by using the supernate as the transfer medium. It is necessary to avoid contacting of this filterable product with wash water since undesirable gelatin occurs which inhibits filtration or other type dewatering and results in a sticky gel incapable of providing the desired ceramic product. The precipitate is then subjected to a heated atmosphere for driving or removing water therefrom until a firm, clay-like cake containing residual water within the range of about 15 to 23 weight percent remains. This clay-like cake may then be wet-formed by extrusion or other conventional mechanical forming techniques into desired configurations, e.g., a rod-shaped body.

The shaped bodies may then be further dried in air at room temperature and a relative humidity of about 60 percent until dried to a hard mass containing about 1 weight percent water. If desired, the latter stages of drying may be accomplished in an oven at a temperature of about 100° C. However, care should be exercised with the dried bodies in that excessive exposure of formed and oven-dried material to ordinary room air causes rapid disintegration of the body due primarily to dehydration of the gel.

In order to form the ceramic product the dry thoria rod is placed in a high temperature furnace and sintered. This sintering step is preferably achieved by raising the temperature of the furnace and its contents in steps of about 50° C. to 100° C. per hour up to 600° C. and thereafter at a rate of about 100° C. per hour up to about 1200° C. After maintaining this latter temperature for about one hour to assure complete sintering of the thoria rod, the sintered rod may be cooled to room temperature at a cooling rate of about 100° C. to 200° C. per hour.

Applicants have found that the dewatered, clay-like actinide oxides can be readily extruded, dried into the form of a hard mass, and fired at about 1200° C. so as to provide a ceramic product in the configuration provided by the extrusion. During the drying steps and the lower temperatures of the sintering steps the inorganic anion provider is readily volatilized or otherwise driven from the thoria rod so as to provide a product of virtually pure thoria. Normally, the extruded thoria body shrinks about 16 percent diametrically during the drying step and about another 16 percent during the sintering step. The final ceramic product has a density of about 97 to 99 percent of the theoretical density and possesses high mechanical strength and integrity.

The microstructure of the ceramic products fabricated by the above-described process has been found to include a network of very fine cracks which may not be desirable if the ceramic product is to be used in an unclad condition or where the structural integrity of the product is of prime consideration. Variations of the moisture content in the clay-like material within the range of wet workability, i.e., about 15 to about 23 weight percent, or in drying uniformity and the use of isostatic pressing following extrusion do not appear to substantially affect the nature of the fired structure. These cracks may, however, be eliminated by substantially increasing the drying and firing times.

Applicants have found that the network of cracks in the fired product may be avoided or eliminated in a more practical manner from a production standpoint than by relying on the protracted drying and firing times. This improvement is achieved by adding pre-sintered thoria powder and/or thoria powder which has been lightly calcined at a temperature of about 200° C. to 500° C. to the clay-like thoria mass prior to the wet-forming step. These powders may provide up to about 60 weight percent of the entire mass and are thoroughly mixed with the clay-like material to assure uniform distribution of the powders throughout the entire mass. The addition of these powders also provides another important contribution in that the density of the ceramic product is lowered and thereby provides a relatively porous ceramic structure from which the escape of fission products is greatly enhanced. With about 60 weight percent of the product being provided by the pre-fired and calcined thoria powders, the density of the ceramic product is about 70 percent theoretical. However, the density of the product may be increased up to about 98 percent theoretical by using smaller quantities of pre-sintered thoria and/or lightly calcined thoria powder. Further, the addition of the pre-fired and calcined thoria powders to the clay-like material provides a mechanism for reducing the diametrical shrinkage of the wet-formed bodies by one-half, for controlling the density of the final ceramic product, and for improving the production economics due to the utilization of scrap thoria.

Thoria-urania ceramic products may be obtained by substituting uranyl nitrate for a portion of the nitric acid used in the starting mixture. This substitution should be based upon the substitution of similar quantities of nitrates. Of course, if the gel-forming solution contains an anion provider other than nitrates, e.g., sulfates or chlorides, the uranium compound should contain a similar anion provider. Satisfactory products have been prepared with a content of about five percent uranium based upon the uranium-thorium content of the product.

The invention is further illustrated by the following examples.

Example I

A volume of 2500 ml. of distilled water and 82 ml. of 15.4 M $HNO_3$ was maintained at 95–100° C. in a 4-liter stainless steel beaker. During a period of 5 minutes, 8 mols (2112 g.) of steam denitrated thoria powder containing about 0.03 mol nitrate per mol of thoria was added to the liquid, with constant stirring. The mixture was maintained within the specified temperature range for 4 hours, with occasional stirring of solids which settled to the bottom. The beaker was loosely covered so that the volume would be reduced by evaporation to about 1500 ml. during this time. The consistency of the mixture gradually became creamy, characteristically like a concentrated thoria sol, and after about 4 hours the consistency thinned, yielding a readily settleable precipitate and a clear supernate. The material was then transferred to a suction filter, using only the supernate as a transfer liquid for the solid material. The filtered material was then dewatered to a firm cake and placed in a sealed container retaining the moisture therein. From a thoria concentration standpoint the plastic, clay-like material was about 10 molar, containing about 20 percent residual water. This clay-like material was then kneaded with thoria powders which have been previously sintered at about 1200° C. and crushed to −325 mesh. These powders provide about 40 percent of the total thoria in the plastic mass. This plastic mass was extruded in a laboratory type press, using a 1-inch powder die adapted for extrusion. Cylindrical extrusions 3 inches long were dried in room air at about 50 percent relative humidity and 25° C. for 24 hours and transferred to a drying oven at 100° C. and held for 2 hours. The dried extrusions were transferred directly to a box-type furnace and heated in air to 1200° C. at a rise rate of about 150° C. per hour. This temperature was maintained for one hour, then reduced at 200° C. per hour to room temperature. Diametrical shrinkage from the wet material to the finally-fired product was 16 percent. The fired body had a maximum variation of about 0.0005 of an inch in diameter from end to end. The density of these extrusions was 8.0 g./cm$^3$, which is 80 percent of the theoretical value.

Example II

Cylindrical extrusions were prepared from the clay-like material and fired by the same procedure described in Example I with the following additional step. A portion of the pre-sintered thoria powders to be added to the plastic mass was replaced by a similar quantity of thoria powders which have been lightly calcined at a temperature of about 200° C. to 500° C. The fired body had a maximum variation of about 0.0005 of an inch in diameter from end to end. The density of these extrusions was 9.5 g./cm.$^3$, which corersponds to 95 percent of the theoretical value.

Example III

Cylindrical extrusions were prepared from the clay-like material and fired by the same procedure described in Example I except that no powder was combined with the clay-like thoria. Drying was in room air for 24 hours. Firing was as described in Example I. The bulk density of the fired product was 9.9 g./cc., which is 99% of theoretical.

The sintering temperature of the colloidal thoria coagulates, after being wet-formed into a desired configuration, is about 1200° C., which temperature is substantially less than the 1800° C.–2000° C. sintering temperature required for non-colloidal thoria powders held together by an organic binder. Also, the densities of the final ceramic product may be selectively varied from about 70 to about 98 percent of the theoretical density by the addition of the pre-sintered and/or lightly calcined thoria powders.

It will be seen that the present invention sets forth a novel process for fabricating actinide oxide fuel rods in a highly productive and economical manner. The ceramic products produced by practicing the present invention may be normally encased in a suitable cladding material for use in nuclear reactor applications. However, these ceramic products also possess sufficient structural integrity without cladding so as to enjoy utilization in applications where cladding is not required. The low density ceramic product may be advantageous as a fission product release type reactor fuel when utilized in a "filter tip" or other pressure relieved cladding.

As various changes may be made in the method, techniques of performing the method, and arrangement of the steps herein without departing from the spirit and scope of the invention and without sacrificing any of its advantages, it is to be understood that all matter herein is to be interpreted as illustrative and not in a limiting sense.

We claim:

1. A method for producing a ceramic product of at least one actinide material and formed in a predetermined configuration, comprising the steps of admixing powdered actinide material with an aqueous solution containing sufficient anions to successively form a colloidal dispersant and a coagulated, readily settleable precipitate, concentrating the precipitate by removing therefrom a sufficient quantity of water to provide a material with a plastic consistency, wet forming the concentrated material into the predetermined configuration, removing substantially all the remaining water from the formed material, thereafter heating the formed material to a temperature sufficient to effect sintering thereof, and maintaining the temperature for a duration sufficient to provide the ceramic product.

2. The method of producing a ceramic product as claimed in claim 1, including the additional step of mixing into the concentrated material a quantity of pre-sintered actinide material in powder form.

3. The method of producing a ceramic product as claimed in claim 2, including the additional step replacing a portion of the pre-sintered actinide material with a portion of actinide material calcined at a temperature less than the sintering temperature thereof.

4. The method of producing a ceramic product as claimed in claim 3, wherein the actinide material admixed with the aqueous solution is steam denitrated thoria, the pre-sintered and calcined actinide materials are thoria with said quantity providing up to about 60 percent of the thoria in the concentrated material, and wherein the density of the ceramic product is selectively varied from about 70 to 98 percent of the theoretical density.

5. The method of producing a ceramic product as claimed in claim 1, including the additional steps of heating the aqueous solution to a temperature of about 95° C. to about 100° C., and maintaining the solution at said temperature for a duration sufficient to effect evaporation of water therefrom until partial flocculation of the actinide material occurs.

6. The method of producing a ceramic product as claimed in claim 5, wherein the actinide material is steam denitrated thoria, the aqueous solution containing the anion is a nitric acid solution, and wherein there is about 0.15 to about 0.18 mol nitrate per mol of thoria in said solution.

7. The method of producing a ceramic product as claimed in claim 6, including the additional step of incorporating sufficient uranyl nitrate in the solution to provide a ceramic thoria-urania product with up to about 5 percent uranium.

8. The method of producing a ceramic product as claimed in claim 1, wherein the removal of the water from the precipitate is terminated when the material has a residual water content in the range of about 15 to about 23 weight percent.

9. A method for fabricating a neutronic fuel element of a rod-like configuration, comprising the steps of heating a solution containing an anion to a temperature in the range of 95° C. to 100° C., stirring the solution, adding steam denitrated thoria powder of −325 mesh to the solution, said anion being present in the solution at a ratio of about 0.15 to about 0.18 mol anion of single charge per mol of thoria, maintaining the temperature of the solution within said range for a duration sufficient to form a colloidal and coagulated precipitate and a clear supernate, separating the precipitate from the supernate, dewatering the precipitate to form a plastic mass containing about 15 to about 23 weight percent water, extruding the plastic mass into a rod-shaped structure, removing essentially all the water from the rod-shaped structure, subjecting the rod-shaped structure to a thoria sintering temperature of up to about 1200° C., maintaining the sintering temperature for a duration sufficient to sinter the entire structure, and thereafter cooling the resulting ceramic product.

10. The method for fabricating a neutronic fuel element as claimed in claim 9, comprising the additional step of admixing a quantity of pre-sintered thoria powder together with a quantity of thoria powder calcined at a temperature less than the sintering temperature thereof into the plastic mass prior to the extrusion thereof, said quantity of pre-sintered and calcined thoria powder being sufficient to provide up to about 60 percent of the thoria in the ceramic product.

References Cited
UNITED STATES PATENTS

| | | | |
|---|---|---|---|
| 3,137,742 | 6/1964 | Sowden | 252—301.1 X |
| 3,211,518 | 10/1965 | Acker et al. | 252—301.1 |
| 3,252,755 | 5/1966 | Delange et al. | |

L. DEWAYNE RUTLEDGE, *Primary Examiner.*